US009288436B2

(12) United States Patent
Eleftheriadis et al.

(10) Patent No.: US 9,288,436 B2
(45) Date of Patent: Mar. 15, 2016

(54) SYSTEMS AND METHODS FOR USING SPLIT ENDPOINTS IN VIDEO COMMUNICATION SYSTEMS

(71) Applicant: Vidyo, Inc., Hackensack, NJ (US)

(72) Inventors: Alexandros Eleftheriadis, Tenafly, NJ (US); Ofer Shapiro, Fair Lawn, NJ (US); Ran Sharon, Tenafly, NJ (US)

(73) Assignee: Vidyo, Inc., Hackensack, NJ (US)

( * ) Notice: Subject to any disclaimer, the term of this patent is extended or adjusted under 35 U.S.C. 154(b) by 27 days.

(21) Appl. No.: 14/267,650

(22) Filed: May 1, 2014

(65) Prior Publication Data

US 2014/0327729 A1 Nov. 6, 2014

Related U.S. Application Data

(60) Provisional application No. 61/817,911, filed on May 1, 2013.

(51) Int. Cl.
*H04N 7/14* (2006.01)
*H04N 7/15* (2006.01)

(52) U.S. Cl.
CPC . *H04N 7/15* (2013.01); *H04N 7/142* (2013.01)

(58) Field of Classification Search
CPC ......... H04N 7/15; H04N 7/147; H04N 7/148; H04N 7/142
USPC ........................................... 348/14.08, 14.09
See application file for complete search history.

(56) References Cited

U.S. PATENT DOCUMENTS

| 5,019,910 | A | 5/1991 | Filmer |
| 6,993,606 | B1 | 1/2006 | Takaku et al. |
| 7,573,497 | B2 * | 8/2009 | Shachar et al. ............ 348/14.01 |
| 8,102,984 | B2 | 1/2012 | Rodman et al. |
| 2009/0033739 | A1 * | 2/2009 | Sarkar et al. ............... 348/14.09 |
| 2010/0060716 | A1 * | 3/2010 | Kert ........................... 348/14.12 |
| 2010/0157015 | A1 * | 6/2010 | Read ........................... 348/14.08 |
| 2011/0292164 | A1 * | 12/2011 | Ben-Zedeff et al. ....... 348/14.08 |
| 2012/0069135 | A1 | 3/2012 | Cipolli et al. |
| 2013/0106975 | A1 * | 5/2013 | Chu et al. .................. 348/14.01 |

OTHER PUBLICATIONS

International Search Report and Written Opinion for PCT/US14/36409, dated Sep. 12, 2014.

* cited by examiner

*Primary Examiner* — Stella L Woo
(74) *Attorney, Agent, or Firm* — Baker Botts LLP

(57) ABSTRACT

Systems and methods for performing videoconferencing using split endpoints are disclosed herein. These endpoints can include a Main Unit and a Satellite Unit that are associated with each other, and where the tasks of video and audio encoding and decoding are separated between the two. In some embodiment the Main Unit performs video and audio encoding, and the Satellite Unit performs video and audio decoding. In some embodiments the Satellite Unit obtains media date through its associated Main Unit, whereas in other embodiments the Satellite Unit obtains media data directly from the Server.

20 Claims, 6 Drawing Sheets (a) Indirect-to-satellite media path (b) Direct-to-satellite media path

SYSTEMS AND METHODS FOR USING SPLIT ENDPOINTS IN VIDEO COMMUNICATION SYSTEMS

PRIORITY AND RELATED APPLICATION

This application claims priority to U.S. Ser. No. 61/817,911, entitled "System and methods for using split endpoints in video communication systems," filed May 1, 2013, incorporated by reference herein in its entirety.

FIELD

The disclosed subject matter relates to video communication systems, including point-to-point or multi-point video communication systems in which endpoints comprise two or more separate components, some performing video or audio encoding and some performing video or audio decoding.

BACKGROUND

Typical video communication systems involve two or more endpoints that are either connected directly to each other through a network, or through one or more servers. The latter configuration can be used for multi-point connections. The endpoints are loci for encoding and decoding audio and video, as well as encoding and decoding computer-generated imagery, referred to as "content". An example is the window from a PowerPoint presentation in such endpoints, the encoding and decoding processes, for both video and audio, can be performed on the same system. An example endpoint would be a desktop computer where encoding and decoding are performed using software. Another example is the VidyoRoom HD-220 system offered by Vidyo, Inc. This system can be connected to a digital, video camera, an audio speakerphone, and up to two displays to provide videoconferencing service to a conference room. Encoding and decoding can be performed on the main unit of the device (in this example, again using software). Other endpoints may use custom or other encoding and decoding hardware to perform the corresponding encoding and decoding operations.

The computational demands of video and audio communication have led, in the past, to certain custom-made systems. Increasing computing power of general-purpose computers, has allowed them to perform the necessary functions using software implementations of the same algorithms on general-purpose CPUs. It is common to run videoconferencing applications on Windows PCs or MacOS systems.

Portable devices such as mobile phones and tablets are now equipped with built-in video and audio decoding chips and can be capable of performing such decoding with significantly lower power requirements. These devices, however, typically perform encoding operations using software. In the absence of dedicated encoding hardware, the encoding runs on the general-purpose CPU of these devices consuming considerable power. It can also be limited by the overall speed profile of the particular microprocessor. Many video coding algorithms are asymmetric, with the encoding process more complex than the decoding process. This can make the task of video encoding on these devices challenging. It would be advantageous to offer one or more separate system units that would perform video encoding, and operate in conjunction with the main unit that performs decoding and display. More than one unit could be used if more than one video stream would need to be encoded. By taking the encoding operation outside the main unit, more resources can be provided and load to improved video quality.

There are other examples where such split system operation can be desirable. Consider the case where one conducts a videoconference with his or her phone, and wants to display the video signal(s) on a nearby TV set. Connecting the phone to the TV with a cable can be done, but likewise can be cumbersome. It would be useful to have a $2^{nd}$ unit that would attach to the TV and would perform decoding and display, and perform encoding on the phone itself. In this example, one may prefer decoding to be performed on the "satellite" system rather than the main unit.

An example where it is desirable to have encoding be done on the "satellite" system, is thin clients, commonly referred to as "virtual desktop infrastructure" (VDI) clients. VDI environments can involve two components: a server component; and a client component. The server component involves a server that can run multiple virtual machine (VM) instances. Each such VM runs an operating system of choice, together with any desired application software that is installed on it. The VM is the actual computer that the end user access. The client component of the VDI environment can utilize software that provides remote access to the remote VM running on the server. The client software is typically very small and efficient, and can thus run on much simpler (and cheaper) hardware than the one running in the VM. Some VDI solutions bundle the client software together with hardware to run it.

VDI systems can allow the partitioning of computational capability so that certain requirements fall on the server side rather than the client side. This can provide an advantage since the server component can be shared by many users and can be more easily managed. In addition, the client component can run on a wide array of different devices, including desktops, laptops, iPads, smartphones, etc., giving users tremendous flexibility in terms of ways to access their data and applications. FIG. 1 shows an example architecture of the a commercially available VMware View system.

An important component of the architecture is the communication between the server and the client component. This is because the quality of the experience that the user enjoys has to do with the responsiveness of the system, as experienced on the client device. If, for example, it takes a considerable amount of time from the instance a user clicks on a button until the button is shown to transition to its clicked state, it can be very frustrating. This transition can depend on the amount of time it takes for the click event to be transmitted from the client to the server, the time it takes for the server to respond to the event and—most significantly—for the screen update to propagate from the server to the client. This last component is typically the one subject to the highest delay, since it involves the transmission of non-trivial amounts of data from the server to the client.

VDI environments employ custom protocols to optimize the communication, of data from, at least, the server to the client and thus minimize both the bitrate needed as well as the delay. The VMware View environment can use the proprietary PCoIP protocol, discussed in "VMware View 5, Performance and Best Practices" published by VMware and available on the web site http://www.vmware.com.

The physical separation of the server component and the client component may be challenging for real-time multimedia applications, such as streaming video and videoconferencing. This is because these applications typically are designed so that the media decoder runs on the same computer or system that the display will take place. There can be a high speed data path available for the decoded data to be sent from the decoder to the display. In a VDI environment, the decoding would typically take place in the server and the display on the client. This can necessitate the transmission of uncompressed, high-volume data such as video to be transmitted from the server to the client. Particularly for applications such as videoconferencing, where both delay and bitrate constraints are strict, this can represent a challenge. It is therefore useful to design systems that can allow video communication in VDI environments.

The ability to have distinct system components perform encoding and decoding is also relevant for multi-camera, multi-monitor systems. These configurations can be used in telepresence systems, among others. Commonly assigned International Patent Application No. PCT/US11/038003, "System and method for scalable communication using multiple cameras and multiple monitors," incorporated herein by reference in its entirety, describes systems and methods for designing systems with multiple cameras and/or multiple monitors. An example of such a system is shown in FIG. 2. The multi-camera/multi-screen endpoint includes a Control Unit 270 to which several Node Units (230, 240, 250) are attached. Three Node Units are shown by way of example; more or fewer can be used. The Node Units 230, 240, and 250 can perform encoding and/or decoding as desired. The configuration is similar to one with a main system and one or more satellite system: the main unit would be a Control Unit with a Node Unit that performs either encoding or decoding; and the satellite unit would be a second Node Unit that performs the other operation (decoding or encoding, respectively). The connection between the individual systems (main and satellite system) can be by network (wired or wireless), by USB attachment (the satellite is a USB device that is attached to the main unit), or some other suitable communication means.

SUMMARY

Systems and methods for performing videoconferencing using split endpoints are disclosed herein.

In some embodiments, endpoints can include a main unit and one or more satellite units. In some embodiments, the main unit can be responsible for overall system control and video encoding, and the satellite units for decoding. In other embodiments the main unit can be responsible for overall system control and video decoding, and the satellite units for encoding.

Figure 1:
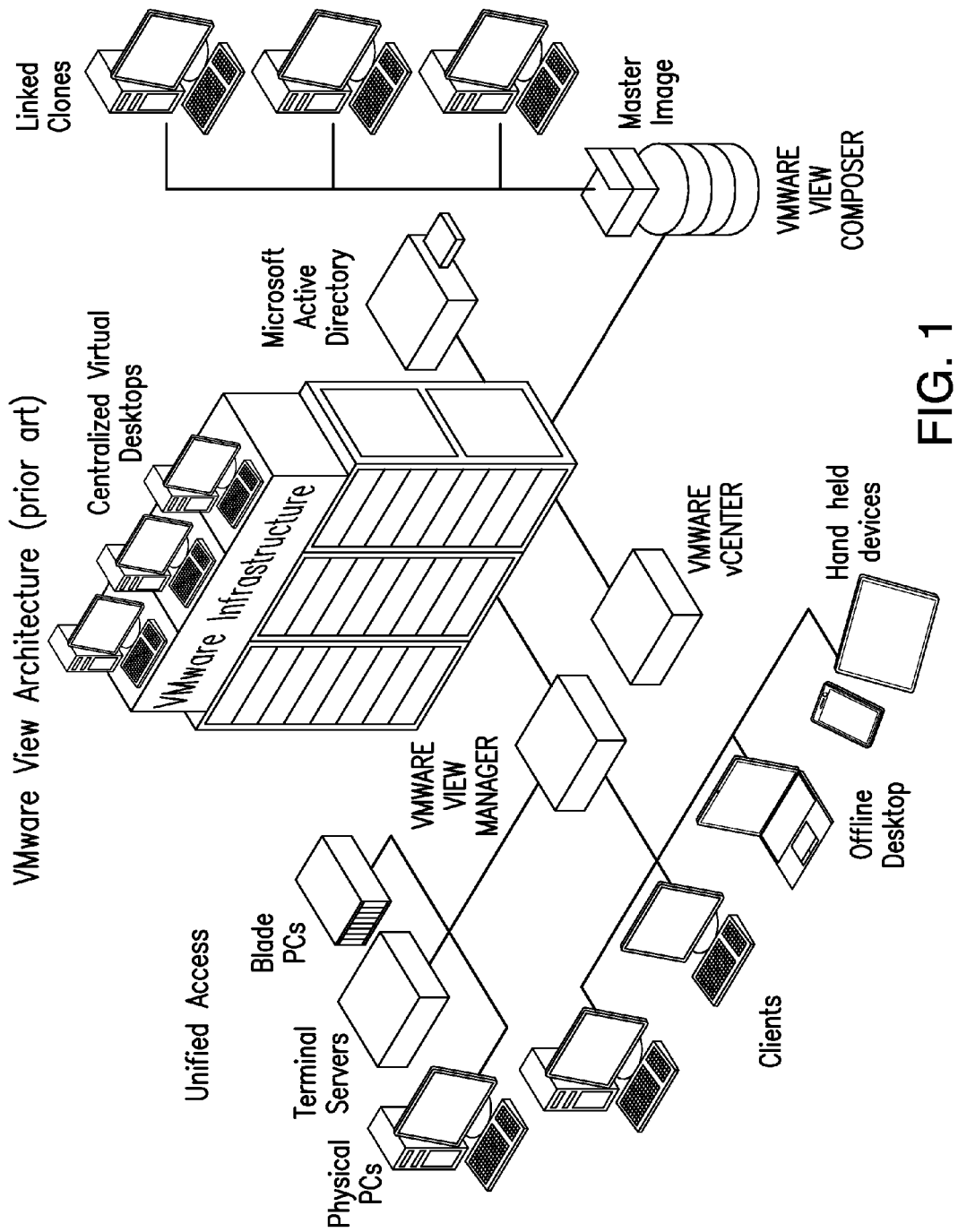
FIG. 1 illustrates the architecture of a commercially available VDI system (prior art)
Figure 2:
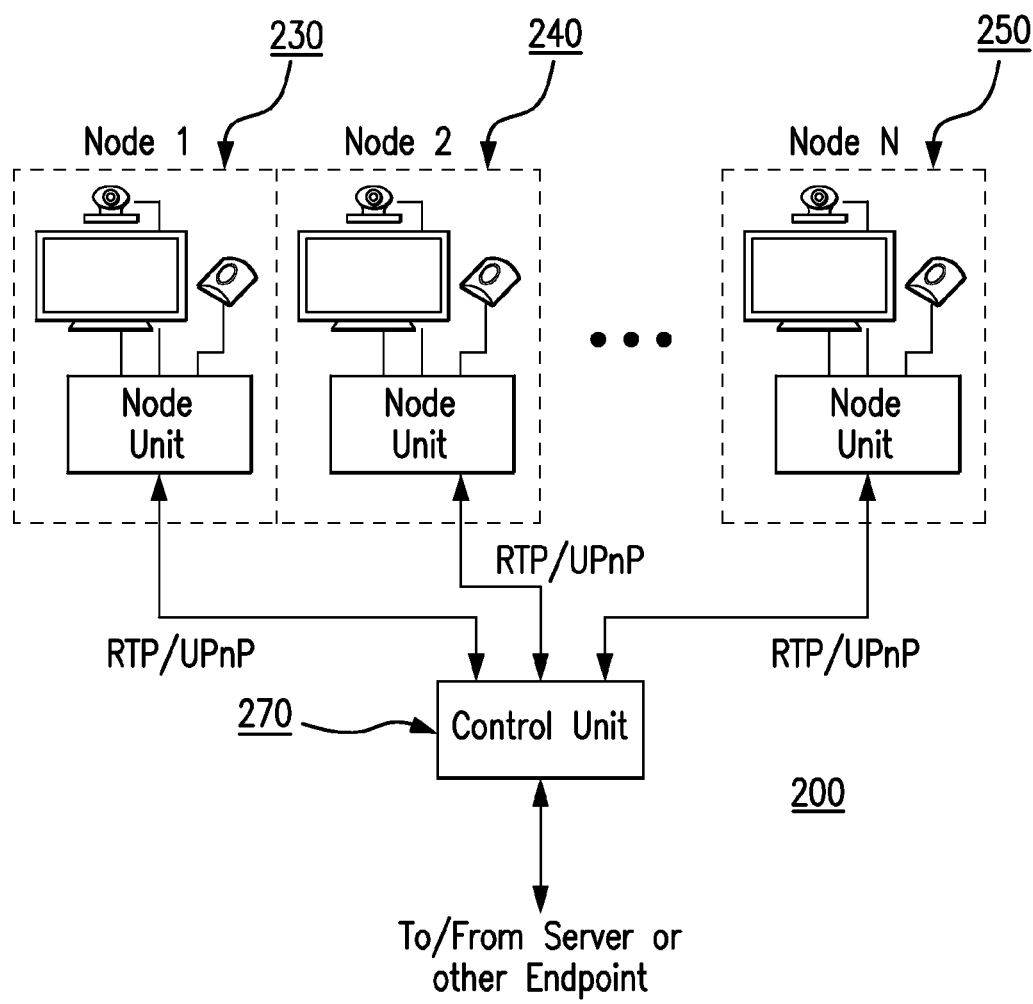
FIG. 2 illustrates the architecture of a multi-monitor/multi-camera endpoint (prior art)

Throughout the figures the same reference numerals and characters, unless otherwise stated, are used to denote like features, elements, components or portions of the Illustrated embodiments. Moreover, while the disclosed subject matter will now be described in detail with reference to the figures, it is done so in connection with the illustrative embodiments.

DETAILED DESCRIPTION

Figure 3:
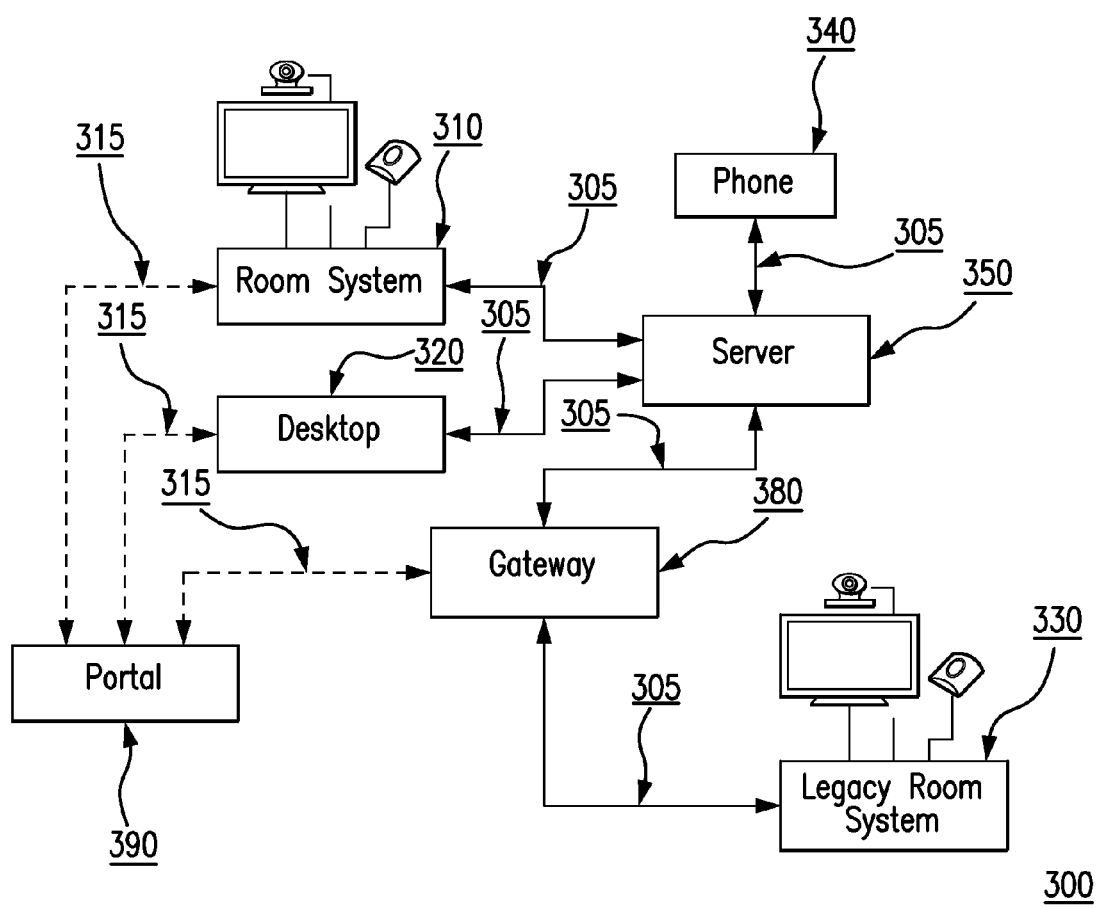
FIG. 3 depicts an exemplary architecture of a videoconferencing system with multiple types of clients in accordance with one or more embodiments of the disclosed subject matter.

FIG. 3 depicts the architecture of an example videoconferencing system with multiple types of endpoints (or clients). The architecture can include a Room System 310, a Phone 340, and a Desktop 320 (e.g., a Windows PC). These endpoints can be interconnected through a Server 350, to which they connect using network connections 305. User and system administration can be performed at a Portal 390, which communicates to the various system components through appropriate signaling connections 315 over a network. The system also shows a Gateway 380 which can be used to convert from the video and audio formats that the endpoints are using to other video and audio formats, so that other systems are able to join the conference. The figures shows a Legacy Room System 330, by way of example, that connects to the Gateway 380. The Gateway 380 can connect to the Server 350, and represent the Legacy Room System 330 in the conference. More or fewer Endpoints can be connected to the Server, and more than one Legacy Endpoint may connect to the Gateway, as is recognized by persons skilled in the art. Similarly, the system may feature more than one Server in a cascade or other configuration, and may also feature more than one Gateway.

Examples of these systems include the VidyoRoom (Room System 310), Vidyo Desktop running on a PC (Desktop 320), Vidyo iPhone/iPad application running on an iPhone or an iPad (Phone 340), VidyoRouter (Server 350), VidyoGateway (Gateway 380), and VidyoPortal (Portal 390) products offered commercially by Vidyo, Inc.

The endpoints shown in FIG. 3 assume that the endpoint combines the encoding and decoding operations. FIG. 4(a) depicts an exemplary architecture of a split endpoint 400. The Endpoint 400 includes a Main Unit 410 and a Satellite Unit 420. The Main Unit 410 can be equipped with, or connected to a Camera and Microphone 415. The connection can be via USB or other suitable means. The Satellite Unit 420 can be connected to, or equipped with, a display such as a TV and speakers 425. The connection 405 from the Satellite Unit 420 to the TV/Speakers 425 may be HDMI or other suitable means.

In some embodiments of the disclosed subject matter, the Satellite Unit 420 may be a mini PC or custom hardware device powered by a USB connection. In this case the Satellite Unit 420 may be plugged in to an available USB port of a modern TV set in order to obtain power, and connected to the display using an HDMI or other audiovisual connection in order to provide video and audio output to the TV. In some embodiments, video and audio output can be provided to the TV through the USB connection itself.

The Main Unit 410 can establish communication sessions over communication networks. For example and not limitation, the Main Unit 410 can connect to a videoconferencing server using a network connection 407. The connection maybe wireless or wired, or a combination thereof. Other communication means may be suitable, such as over cellular phone, microwave links, etc. Additionally, the Satellite Unit 420 and Main Unit 410 can communicate with each other using a connection 404a. The connection 404a may be over an IP network such as the wireless network commonly found in offices and households. In some embodiments of the disclosed subject matter the Satellite Unit 420 obtains all data (video, audio, and signaling) through its connection 404a to the Main Unit 410. In other embodiments, as shown in FIG.

4(*b*), the Satellite Unit 420 may obtain media data directly from the server through its own connection 408. The Satellite Unit 420 to Main Unit 410 connection 404*b* in this case carries signaling data.

Figure 4:
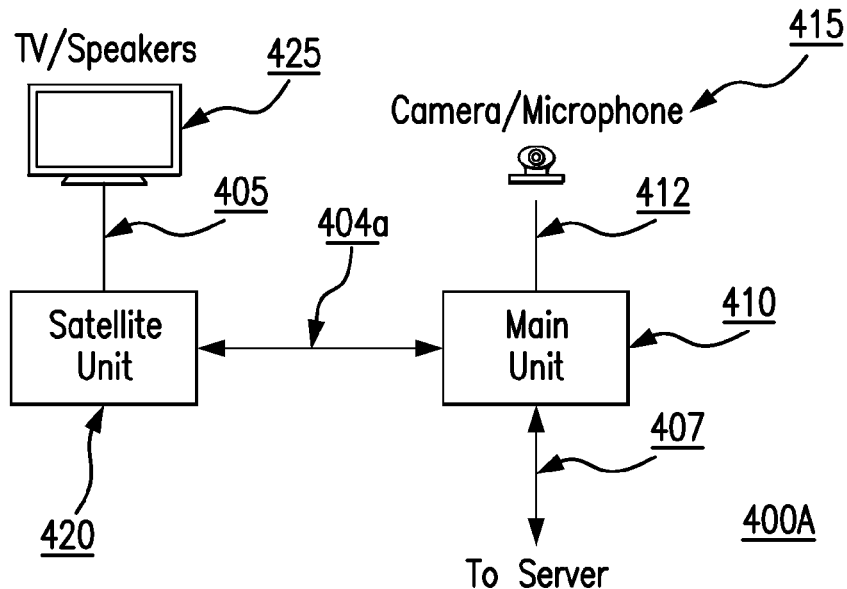
FIG. 4 depicts an exemplary architecture of a split endpoint with a decoding, satellite, with indirect (a) and direct (b) media paths from the server to the satellite system.
Figure 4:
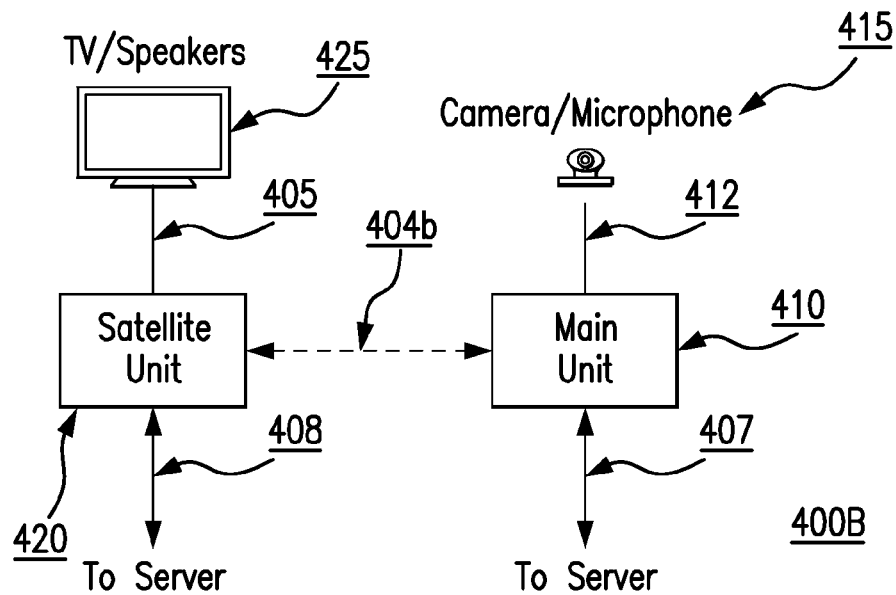
Figure 5:
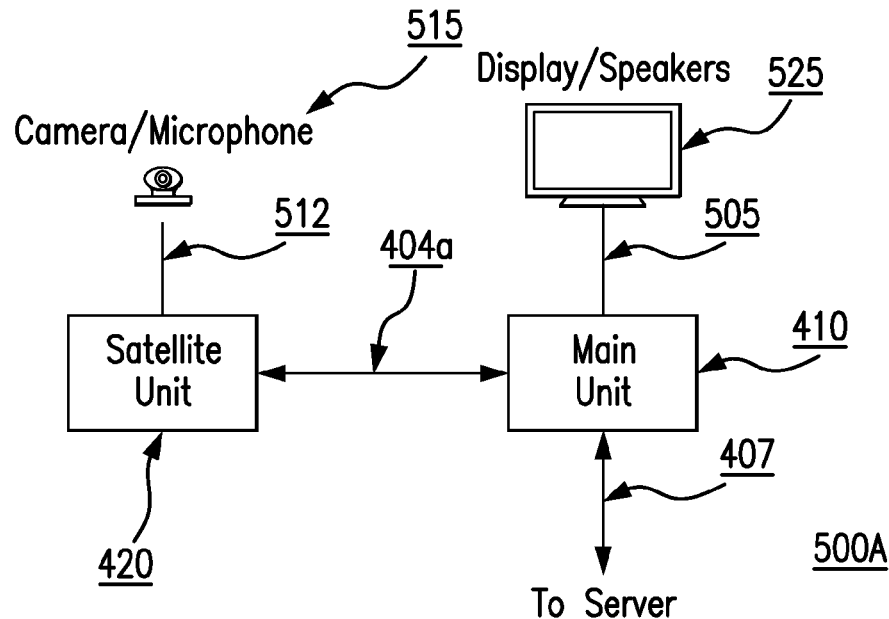
FIG. 5 depicts an exemplary architecture of a split endpoint with an encoding satellite, with indirect (a) and direct (b) media paths from the server to the satellite system.
Figure 5:
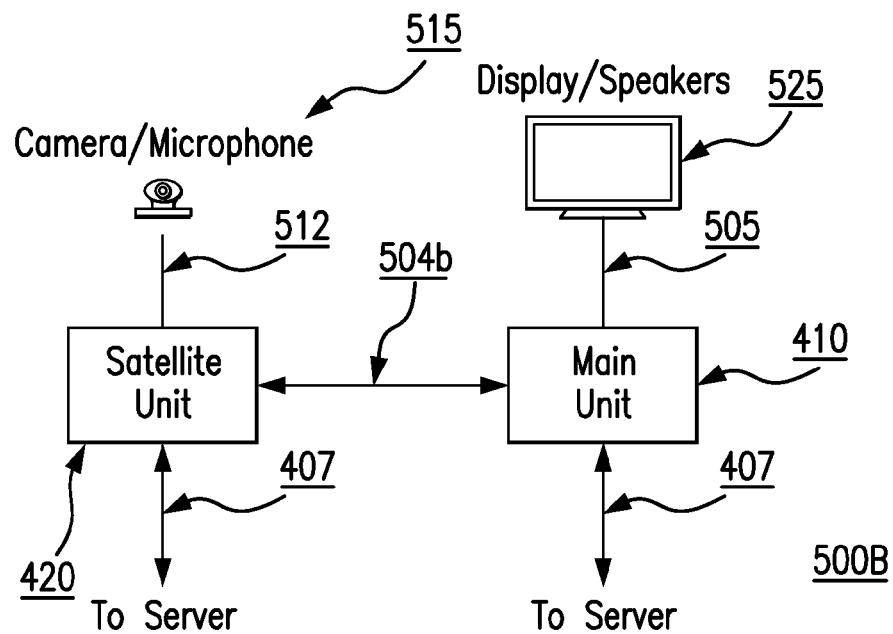

In FIG. 4 the Satellite Unit can provide decoding operation whereas the Main Unit can perform encoding. These responsibilities can be exchanged such that the Main Unit performs decoding and the Satellite Unit performs encoding. This is shown in FIG. 5(*a*) and (*b*). In this embodiment the Main Unit 410 is equipped with, or connected to, a display and speakers. The connection may be through HDMI or other suitable means. The Satellite Unit 420 can be equipped with, or connected to, a camera and microphone 515. The connection 512 may be through USB or other suitable audiovisual connection. Although only one Satellite Unit is shown, the system operates in an identical way when more than one Satellite Unit is available. As with FIG. 4, there are two configuration: one where the Satellite Unit 420 can connect to the server through the Main Unit 410 (FIG. 5(*a*)) and one where the Satellite Unit 420 can connect to the server directly (FIG. 5(*a*)). In the former case, the Satellite Unit 420 and Main Unit 410 communicate with each other over the connection 504*a* which carries both signaling and media data, whereas in the latter case the connection 504*b* carries signaling data.

The operation of the system is essentially identical regardless if the Satellite Unit performs encoding or decoding. In some embodiments the Main Unit may be a smart phone such as an iPhone, or a tablet such as an iPad. In other embodiments it may be a VDI thin client. For an iPhone or iPad, it is useful if the Satellite Unit performs decoding and display on a big TV screen whereas the iPhone or iPad (Main Unit) performs encoding. The Satellite Unit may be implemented on a USB stick mini PC running the Google Android operating system, such as the MK802 device commercially available by Shenzhen Rikomagic Tech Corp. Ltd. The device can plug in to a USB port and provides an HDMI video and audio output.

For a VDI thin client, it can be useful if the Satellite Unit performs the encoding whereas the VDI thin client (Main Unit) performs the decoding.

Two alternative configurations are: the Main Unit performs video encoding and audio decoding, and the Satellite Unit performs video decoding and audio encoding; and, conversely, the Main Unit performs video decoding and audio encoding, and the Satellite Unit performs video encoding and audio decoding. These can be implemented in the same way as the other two configurations presented above.

The operation of the split endpoint in terms of configuration and media transfer is next described with reference to the decoding satellite configuration of FIG. 4. However, it is noted that the operation is substantially identical for the encoding satellite configuration as is recognized by persons skilled in the art.

One can implement the functionality of a split endpoint using two endpoints. This can be accomplished as follows. One endpoint can be connected to the videoconferencing call and its audio and video is muted, i.e., the endpoint does not generate any audio or video. It does, however, receive video and audio from the system and displays it on its screen, and plays the corresponding audio on its speaker/headphones. A second endpoint can be connected to the videoconferencing call. Depending on the endpoint implementation, the endpoint may be able to request from the system that it does not receive video, or audio, or both. Typically the endpoint may be able to indicate that it does not want to receive video, but it does not have a choice with regards to audio. This can be the case with the commercially available VidyoDesktop system offered by Vidyo, Inc. The user can select the number of participants to show ion the screen, and the system does offer the possibility of setting the number to zero. For the audio, however, the user can set the output volume to zero, so that no audio is produced by the device. Although functionally this appears to implement a split endpoint system, the system may waste bandwidth because the second system receives audio that it will not play. Also the encoding or decoding capability of the corresponding system might not be utilized. Finally, setting up this configuration may be cumbersome as the user has to make two connections and set the systems up in the proper way.

An exemplary split system operation is now described. The Main Unit can be a smartphone such as an iPhone running appropriate software, and the Satellite Unit can be a USB-based computer with an HDMI output for video and audio, again running appropriate software. The software on the Main Unit can offer an option to run its endpoint client in standalone mode or in split mode. When the user selects the split mode, the software on the Main Unit can display a list of available Satellite Units, including an option to add new ones. When the user requests that a new one is to be added, the software on the Main Unit can transmit broadcast packets on the local network on a predefined port and waits for any response.

When the Main Unit is in such "pairing" mode, the Satellite Unit can be turned on and can also be set in "pairing" mode by pressing a button. If no button is available due to the form factor, the Satellite Unit could enter pairing mode for a minute during power on, before proceeding with its operation. It could also automatically enter pairing mode if it detects that it is not paired with any Main Unit.

When the Satellite Unit receives a pairing request from a Main Unit it responds and from that point forward, until reset, it can operate as the Satellite Unit associated with that particular Main Unit. The Satellite Unit can be provided with conferencing data such as user name etc. from the Main Unit.

In another embodiment, the Satellite Unit may be registered first to the Portal rather than the Main Unit. In this case the list of available Satellite Units can be provided to the Main Unit through the Portal during user registration. Connecting a Satellite Unit to the Portal may require some configuration, since the Portal may not be on the same local network as the Satellite Unit. A web-based interface may be provided on the Satellite Unit for such configuration, similar to the web-based interface provided in network routers and other similar devices that lack a user interface.

The operation of the split endpoint during a call may differ depending on if an indirect or a direct media path to the Satellite Unit is utilized. First consider the indirect-to-satellite media path (as shown in FIG. 4(*a*)). When the Main Unit makes or receives a call, it can proceed to transmit and receive media as a normal endpoint. In fact, as far as the remote Server is concerned (not shown in the figure), there may be no way to distinguish if the endpoint is split or not. The Main Unit, however, can forward media data to the Satellite Unit for decoding and display/playback. It also can send it information when a call is established or terminated. Encoding can take place on the Main Unit and thus does not involve the Satellite Unit. In an encoding Satellite Unit as shown in FIG. 5, then the Satellite Unit may be transmitting encoded video and audio data to the Main Unit for forwarding to the Server.

Note that the communication of the media data between the Main Unit and the Satellite Unit can be performed across a network connection (404*a* and 504*a*). As a result, the data may experience losses or delays. The Main Unit and Satellite Unit may employ techniques similar to those employed by the Server and other Endpoints to mitigate such losses.

In one embodiment of the disclosed subject matter Scalable Video Coding (SVC) may be used. SVC is an extension of the well-known video coding standard H.264 that is used in most digital video applications and has proven to be very effective in interactive video communication. The bitstream syntax and decoding process are formally specified in ITU-T Recommendation H.264, and particularly Annex G. ITU-T Rec. H.264, incorporated herein by reference in its entirety, and can be obtained from the International telecommunications Union, Place de Nations, 1120 Geneva, Switzerland, or from the web site www.itu.int. The packetization of SVC for transport over RTP is defined in RFC 6190, "RTP pay load format for Scalable Video Coding," incorporated herein by reference in its entirety, which is available from the Internet Engineering Task Force (IETF) at the web site http://www.i-etf.org.

Scalable video and audio coding has been beneficially used in video and audio communication using the so-called Scalable Video Coding Server (SVCS) architecture. The SVCS is a type of video and audio communication server and is described in commonly assigned U.S. Pat. No. 7,593,032. "System and Method for a Conference Server Architecture for Low Delay and Distributed Conferencing Applications", as well as commonly assigned International Patent Application No. PCT/US06/62569, "System, and Method for Videoconferencing using Scalable Video Coding and Compositing Scalable Video Servers," both incorporated herein by reference in their entireties. It provides an architecture that allows for very high quality video communication with high robustness and low delay.

Commonly assigned International Patent Application Nos. PCT/US06/061815, "Systems and methods for error resilience and random access in video communication systems," PCT/US07/63335, "System and method for providing error resilience, random access, and rate control in scalable video communications," and PCT/US08/50640, "Improved systems and methods for error resilience in video communication systems," all incorporated herein by reference in their entireties, further describe mechanisms through which a number of features such as error resilience and rate control are provided through the use of the SVCS architecture.

Techniques such as "R" pictures (PCT/US06/061815, previously cited) with NACK-based retransmissions can be used not only between Endpoints and Servers, or between Servers, but also between the Main Unit and Satellite Unit. The feature is also available through the RTP pay load format for SVC (RFC 6190 previously cited), with the TL0PICIDX and related parameters.

Next consider the direct-to-satellite media path (as shown in FIG. 4(b)). In this configuration, a direct connection between the Satellite Unit and the Server is established when making or receiving a call. For this purpose, the Server can be configured to support split endpoint operation. Practically this means that it will use two different connections for transmitting and receiving media data. Depending on whether an Encoding or Decoding Satellite Unit is used, the Server will receive from, or transmit data to, the Satellite Unit, and correspondingly transmit data to, or receive from, the Main Unit. The Satellite Unit information (IP address and other configuration information) can be provided to the Server from the Main Unit when it establishes a connection for making or receiving a call. The Main Unit is still responsible for call handling, such as hanging up, etc. It can inform the Satellite Unit on any state changes through its signaling connection 404b/504b. For example, if the user selects to mute on the Main Unit 410 as shown in FIG. 4(b), the Main Unit 410 can send a message to the Satellite Unit 420 over the connection 404b.

In alternative embodiments call signaling may be duplicated between the Server and the Satellite Unit rather than be routed through the Main Unit. In other embodiments where Server cascading is used, the system may assign different Servers to the Main Unit and the Satellite Unit. Cascaded server operation is described, for example, in commonly assigned International Patent Application No. PCT/US11/052430, "System and method for the control, and management of multipoint conferences," incorporated herein by reference in its entirety.

The methods for using split endpoints in video communication systems described above can be implemented as computer software using computer-readable instructions and physically stored in computer-readable medium. The computer software can be encoded using any suitable computer languages. The software instructions can be executed on various types of computers. For example, FIG. 6 illustrates a computer system 0600 suitable for implementing embodiments of the present disclosure.

Figure 6:
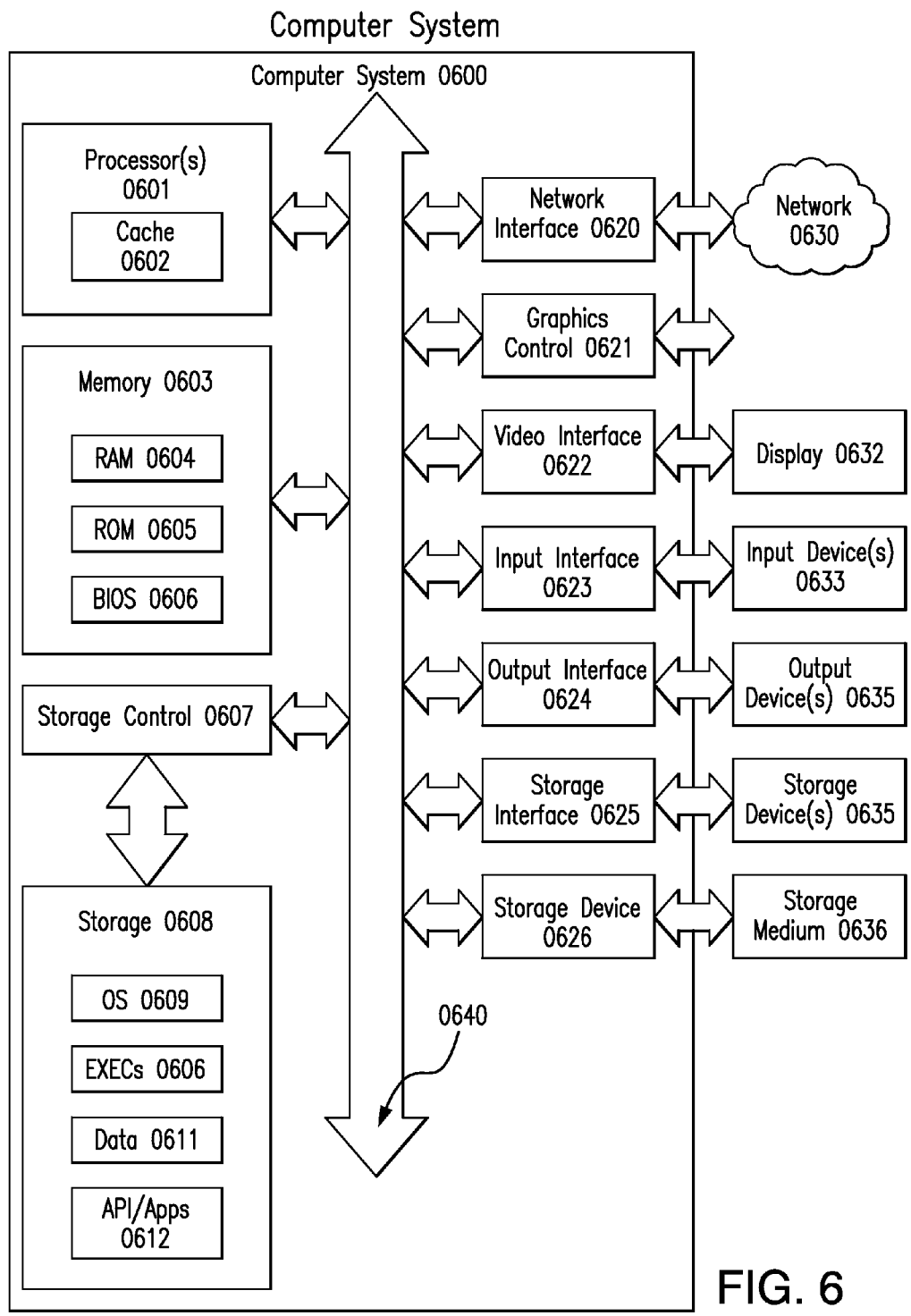
FIG. 6 depicts an exemplary computer system according to an embodiment of the disclosed subject matter.

The components shown in FIG. 6 for computer system 0600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 0600 can have many physical forms including an integrated circuit, a printed circuit hoard, a small handheld device (such as a mobile telephone or PDA), a personal computer or a super computer.

Computer system 0600 includes a display 0632, one or more input, devices 0633 (e.g., keypad, keyboard, mouse, stylus, etc.), one or more output devices 0634 (e.g., speaker), one or more storage devices 0635, various types of storage medium 0636.

The system bus 0640 link a wide variety of subsystems. As understood by those skilled in the art, a "bus" refers to a plurality of digital signal lines serving a common function. The system bus 0640 can be any of several types of bus structures including a memory bus, a peripheral bus, and a local bus using any of a variety of has architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 0601 (also referred to as central processing units, or CPUs) optionally contain a cache memory unit 0602 for temporary local storage of instructions, data, or computer addresses. Processor(s) 0601 are coupled to storage devices including memory 0603. Memory 0603 includes random access memory (RAM) 0604 and read-only memory (ROM) 0605. As is well known in the art, ROM 0605 acts to transfer data and instructions uni-directionally to the processor(s) 0601, and RAM 0604 is used typically to transfer data and instructions in a bi-directional manner. Both of these types of memories can include any suitable of the computer-readable media described below.

A fixed storage 0608 is also coupled bi-directionally to the processor(s) 0601, optionally via a storage control unit 0607. It provides additional data storage capacity and can also include any of the computer-readable media described below. Storage 0608 can be used to store operating system 0609, EXECs 0610, application programs 0612, data 0611 and the like and is typically a secondary storage medium (such as a hard disk) that is slower than primary storage. It should be appreciated that the information retained within storage 0608, can, in appropriate cases, be incorporated in standard fashion as virtual memory in memory 0603.

Processor(s) 0601 is also coupled to a variety of interfaces such as graphics control 0621, video interface 0622, input interface 0623, output interface 0624, storage interface 0625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 0601 can be coupled to another computer or telecommunications network 0630 using network interface 0620. With such a network interface 0620, it is contemplated that the CPU 0601 might receive information from the network 0630, or might output information to the network in the course of performing the above-described method. Furthermore, method embodiments of the present disclosure can execute solely upon CPU 0601 or can execute over a network 0630 such as the Internet in conjunction with a remote CPU 0601 that shares a portion of the processing.

According to various embodiments, when in a network environment, i.e., when computer system 0600 is connected to network 0630, computer system 0600 can communicate with other devices that are also connected to network 0630. Communications can be sent to and from computer system 0600 via network interface 0620. For example, incoming communications, such as a request or a response from another device, in the form of one or more packets, can be received from network 0630 at network interface 0620 and stored in selected sections in memory 0603 for processing. Outgoing communications, such as a request or a response to another device, again in the form of one or more packets, can also be stored in selected sections in memory 0603 and sent out to network 0630 at network interface 0620. Processor(s) 0601 can access these communication packets stored in memory 0603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 0600 can provide functionality as a result of processor(s) 0601 executing software embodied in one or more tangible, computer-readable media, such as memory 0603. The software implementing various embodiments of the present disclosure can be stored in memory 0603 and executed by processor(s) 0601. A computer-readable medium can include one or more memory devices, according to particular needs. Memory 0603 can read the software from one or more other computer-readable media, such as mass storage device(s) 0635 or from one or more other sources via communication interface. The software can cause processor(s) 0601 to execute particular processes or particular parts of particular processes described herein, including defining data structures stored in memory 0603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosed subject matter. It will thus be appreciated that those skilled in the art will be able to devise numerous systems and methods which, although not explicitly shown or described herein, embody the principles of the invention and are thus within the spirit and scope thereof.

What is claimed is:

1. A video communication system comprising:
    a main unit for receiving and transmitting video signals over a first communication network, the main unit including a video decoder coupled to a display,
    at least one server coupled to the main unit over the first communication network;
    a satellite unit coupled to the at least one server over a second communication network, the satellite unit including a video encoder coupled to a video camera,
    wherein the main unit is configured to establish communication sessions over the first communication network, and instruct the at least one server to transmit encoded video from the camera of the satellite unit to the main unit, and wherein the main unit is further configured to transmit over the first communication network the encoded video received from the server over the first communication network.

2. The system of claim 1, wherein the satellite unit is associated with the main unit by transmitting associated pairing information between the main unit and the satellite unit via the server.

3. The system of claim 1, wherein the video encoder of the satellite unit is configured to use temporal scalability, and wherein the satellite unit is configured to use retransmissions of at least the base temporal layer of the encoded video for reliable delivery when transmitting the encoded video to the server.

4. The system of claim 1, wherein the at least one server is configured to receive the encoded video from the satellite unit over the second communication network and transmit the encoded video to the main unit over the first communication network.

5. A video communication system, the system comprising:
 a main unit for receiving and transmitting video signals over a first communication network, the main unit including a video encoder coupled to a camera,
 at least one server coupled to the main unit over the first communication network;
 a satellite unit coupled to the at least one server over a second communication network, the satellite unit including a video decoder coupled to a display,
 wherein the main unit is configured to establish communication sessions over the first communication network, and also configured to forward over the first communication network to the server encoded video received over the first communication network, and
 wherein the server is configured to forward the encoded video to the satellite unit over the second communication network for decoding and display.

6. The system of claim 5, wherein the encoded video uses a temporal scalability, and wherein the main unit is configured to use retransmissions of at least the base temporal layer of the encoded video for reliable delivery when transmitting the encoded video to the server.

7. The system of claim 5, wherein the satellite unit is associated with the main unit by transmitting associated pairing information between the main unit and the satellite unit via the server.

8. A video communication system comprising:
 a main unit for receiving video signals over a first communication network, the main unit including a video decoder coupled to a display,
 at least one server coupled to the main unit over the first communication network;
 a satellite unit for transmitting video signals over a second communication network, coupled to the server over the second communication network, the satellite unit including a video encoder coupled to a video camera,
 wherein the main unit is configured to establish communication sessions over the first communication network, and instruct the at least one server to transmit encoded video from the camera of the satellite unit over the first communication network.

9. The system of claim 8, wherein the satellite unit is associated with the main unit by transmitting associated pairing information between the main unit and the satellite unit via the server.

10. The system of claim 8, wherein the at least one server is configured to receive the encoded video from the satellite unit over the second communication network and transmit the encoded video to the main unit over the first communication network.

11. A video communication system comprising:
 a main unit for transmitting video signals over a first communication network, the main unit including a video encoder coupled to a camera,
 at least one server coupled to the main unit over the first communication network;
 a satellite unit for receiving video signals over a second communication network, coupled to the server over the second communication network, the satellite unit including a video decoder coupled to a display,
 wherein the main unit is configured to establish communication sessions over the first communication network, and instruct the server to receive encoded video over the first communication network, and
 wherein the server is configured to instruct the satellite unit to receive the encoded video over the second communication network for decoding and display.

12. The system of claim 11, wherein the satellite unit is associated with the main unit by transmitting associated pairing information between the main unit and the satellite unit via the server.

13. An audio communication system comprising:
 a main unit for receiving and transmitting audio signals over a first communication network, the main unit including an audio decoder coupled to one or more speakers,
 at least one server coupled to the main unit over the first communication network;
 a satellite unit coupled to the server over a second communication network, the satellite unit including an audio encoder coupled to a microphone,
 wherein the main unit is configured to establish communication sessions over the first communication network, and instruct the at least one server to transmit encoded audio from the microphone of the satellite unit to the main unit, and wherein the main unit is further configured to transmit over the first communication network the encoded audio received from the server over the first communication network.

14. The system of claim 13, wherein the satellite unit is associated with the main unit by transmitting associated pairing information between the main unit and the satellite unit via the server.

15. An audio communication system comprising:
 a main unit for receiving and transmitting audio signals over a first communication network, the main unit including an audio encoder coupled to a microphone,
 at least one server coupled to the main unit over the first communication network;
 a satellite unit coupled to the server over a second communication network, the satellite unit including an audio decoder coupled to one or more speakers,
 wherein the main unit is configured to establish communication sessions over the first communication network, and also configured to forward over the first communication network to the server encoded audio received over the first communication network, and
 wherein the server is configured to forward the encoded audio to the satellite unit over the second communication network for decoding and playback.

16. The system of claim 15, wherein the satellite unit is associated with the main unit by transmitting associated pairing information between the main unit and the satellite unit via the server.

17. An audio communication system comprising:
 a main unit for receiving audio signals over a first communication network, the main unit including an audio decoder coupled to one or more speakers,
 at least one server coupled to the main unit over the first communication network;
 a satellite unit for transmitting audio signals over a second communication network, coupled to the server over the second communication network, the satellite unit including an audio encoder coupled to a microphone,
 wherein the main unit is configured to establish communication sessions over the first communication network, and instruct the server to transmit encoded audio from the microphone of the satellite unit over the first communication network.

18. The system of claim 17, wherein the satellite unit is associated with the main unit by transmitting associated pairing information between the main unit and the satellite unit via the server.

19. An audio communication system comprising:
- a main unit for transmitting audio signals over a first communication network, the main unit including an audio encoder coupled to a microphone,
- at least one server coupled to the main unit over the first communication network;
- a satellite unit for receiving audio signals over a second communication network, coupled to the server over the second communication network, the satellite unit including an audio decoder coupled to one or more speakers,
- wherein the main unit is configured to establish communication sessions over the first communication network, and instruct the server to receive encoded audio over the first communication network, and
- wherein the server is configured to instruct the satellite unit to receive the encoded audio over the second communication network for decoding and playback.

20. The system of claim 19, wherein the satellite unit is associated with the main unit by transmitting associated pairing information between the main unit and the satellite unit via the server.

\* \* \* \* \*